Dec. 6, 1932.  M. D. CODY  1,889,883

FRUIT JUICE EXTRACTOR

Filed Nov 26, 1928

Inventor
Marie D. Cody
By *(signature)*
her Attorney

Patented Dec. 6, 1932

1,889,883

UNITED STATES PATENT OFFICE

MARIE D. CODY, OF FROSTPROOF, FLORIDA

FRUIT JUICE EXTRACTOR

Application filed November 26, 1928. Serial No. 321,972.

This invention relates to an improvement in fruit juice extractors.

One object of the invention is to provide for extracting the juice from such fruits as oranges, grape-fruit, etc. by inserting an extractor into the fruit through the hull or skin thereof either at the stem or blossom end and approximately longitudinally of the core about the core and seeds. This breaks down the cells of the orange or fruit at its center, and by applying a suction to the extractor the juice may be withdrawn from all of the sections of the fruit, this not being in any way interfered with or hindered by reason of the core or seeds.

Another object of the invention is to provide an extractor of this character which is simple and may be inexpensively and easily manufactured, and yet will effectively act to withdraw the juice from such fruit upon being inserted thereinto. A rubber ring may be seated around the extractor to effectively seal the opening, about the extractor.

Figure 1:
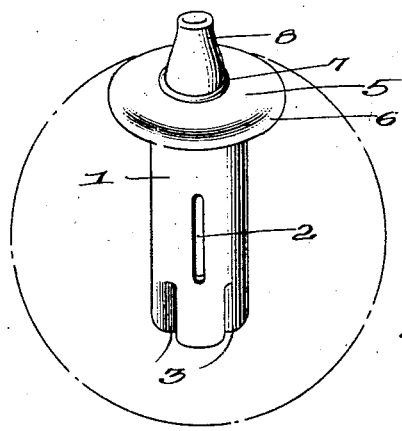
Fig. 1 is a perspective view of the extractor.
Figure 2:
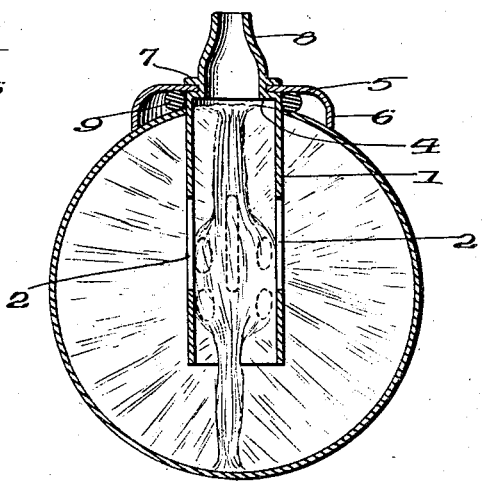
Fig. 2 is a sectional view showing the extractor inserted into the fruit.

The numeral 1 indicates the body of the extractor which is made approximately cylindrical in shape with the inner end thereof open and may be provided with a plurality of slots 2 arranged about the body thereof, as shown in Figs. 1 and 2.

The walls of the body portion 1 at the open inner end thereof are provided with indentations 3, which extend to the open end for the purpose of breaking down the cells of the fruit as the extractor is inserted.

Figure 3:
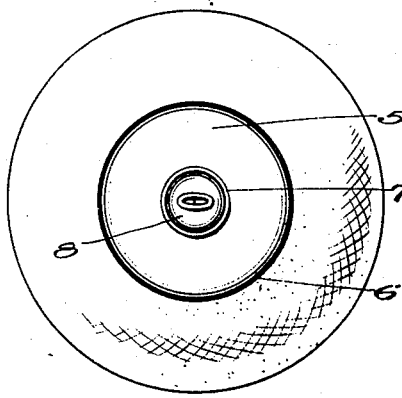
Fig. 3 is a plan view thereof.
Figure 4:
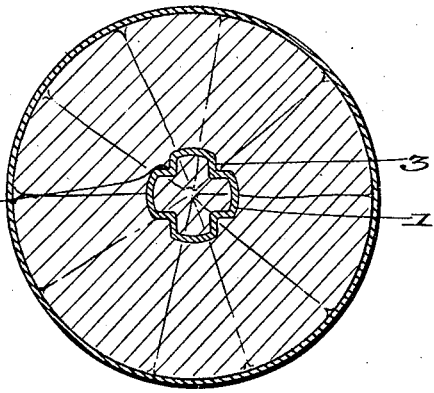
Fig. 4 is a transverse sectional view through the extractor and fruit.

The upper end of the body portion 1 is reduced in size and provided with a shoulder 4, over which is fitted a plate 5 having a downturned outer edge 6 adapted to bear against the outer surface of the skin of the fruit. The outer end of the body portion 1 is bent around the inner edge of the plate 5 in the form of a lip 7 to hold the plate in place and then terminates in a reduced mouth piece 8 of approximately the shape shown in Fig. 3, which is of such reduced size that the seeds of the fruit may not be withdrawn through the extractor.

A rubber ring 9 is seated around the body 1 of the extractor closely under the plate 5, so as to be pressed against the wall of the fruit to effectively close the opening about the extractor and aid the downturned flange 6 to form a vacuum under the plate 5 to prevent the ingress of air into the fruit as the juice is withdrawn.

In using the extractor, the skin of the fruit is broken around the blossom or stem end of the fruit and the extractor is inserted therethrough around the core and seeds of the fruit, the indentations 3 serving to break down the cells of the fruit as the extractor is inserted, and by inserting the extractor over the core and longitudinally thereof, the seeds and core are entirely confined in the enlarged portion 1 of the extractor, and then by applying suction at the mouth-piece 8 the juice may easily be withdrawn through the extractor.

All seeds being confined in the barrel or body portion 1, they cannot interfere with the proper withdrawal of the juice of the fruit and because of the reduced mouth-piece 8, the seeds cannot be withdrawn from the fruit through the extractor.

The extractor is made in only two parts, the mouth-piece being formed on the barrel or body portion and the plate 5 may be squeezed thereover and held in place between the lip 7 and the shoulder 4, where it is securely fastened, and when the flange 6 together with the ring 9 are pressed against the surface of the fruit about the opening through which the extractor is inserted it prevents air from being drawn into the fruit, which would interfere with the withdrawal of the juice, and change the character of the juice to an undesirable degree.

I claim:—

1. A fruit juice extractor including a body portion formed approximately cylindrical in shape and having an open inner end provided with longitudinal indentations in the side walls thereof and terminating at its outer end in a mouth-piece of substantially reduced size and area for the withdrawal of the juice from the fruit by suction action.

2. A fruit juice extractor including a body portion having a mouth-piece connected therewith for withdrawal of the juice by suction, a flange protruding outwardly from the body portion, and a rubber ring seated around the body portion under the flange to close the opening through which the extractor is inserted.

3. A fruit juice extractor comprising a tubular body portion of approximately uniform diameter throughout and formed at its upper end with an inturned shoulder, and a mouthpiece above the shoulder, a plate fitted over the mouthpiece and against the shoulder, and a lip for holding the plate in place.

4. A fruit juice extractor comprising a body portion adapted to be inserted through the side of the fruit, and having a mouthpiece connected therewith for withdrawal of the juice by suction, a flange protruding outwardly from the body portion, and an annular sealing ring approximately round in cross section seated under the flange to seal the opening through which the extractor was inserted.

5. A fruit juice extractor comprising a tubular body portion of approximately uniform diameter throughout and formed at its upper end with an inturned shoulder, a mouthpiece above the shoulder, a plate fitted over the mouthpiece and against the shoulder, and means for holding the plate in place.

In testimony whereof I affix my signature.

MARIE D. CODY.